United States Patent [19]
Lindenmeyer

[11] Patent Number: 5,182,686
[45] Date of Patent: Jan. 26, 1993

[54] APPARATUS AND METHOD FOR LOADING AND UNLOADING MULTIPLE DIGITAL TAPE CASSETTES UTILIZING A REMOVABLE MAGAZINE

[75] Inventor: Carl W. Lindenmeyer, St. Charles, Ill.

[73] Assignee: Universities Research Association, Inc., Washington, D.C.

[21] Appl. No.: 504,439

[22] Filed: Apr. 4, 1990

[51] Int. Cl.$^5$ ................... G11B 15/68; B65D 85/672
[52] U.S. Cl. ........................................ 360/92; 360/71; 369/38; 206/387
[58] Field of Search ................ 360/71, 92; 369/34–39; 220/380; 206/444, 503, 387

[56] References Cited

U.S. PATENT DOCUMENTS

| | | | |
|---|---|---|---|
| 3,692,376 | 9/1972 | McKinsey et al. | 312/11 |
| 4,145,724 | 3/1979 | Medding et al. | 360/92 |
| 4,275,425 | 6/1981 | Watanabe et al. | 360/92 |
| 4,348,152 | 9/1982 | Takamatsu | 414/785 |
| 4,384,310 | 5/1983 | Schatteman et al. | 360/92 |
| 4,465,327 | 8/1984 | Westley | 312/11 |
| 4,594,042 | 6/1986 | Hoffman | 414/32 |
| 4,609,232 | 9/1986 | Florence | 312/16 |
| 4,622,610 | 11/1986 | Makigawa | 360/92 |
| 4,647,989 | 3/1987 | Geddes | 360/55 |
| 4,654,727 | 3/1987 | Blum et al. | 360/71 |
| 4,697,215 | 9/1987 | Hata | 360/95 |
| 4,712,678 | 12/1987 | Ackeret | 206/387 |
| 4,722,034 | 1/1988 | Ackeret | 362/86 |
| 4,731,682 | 3/1988 | Nishiyama et al. | 360/92 |
| 4,907,889 | 3/1990 | Simone | 360/92 |
| 4,940,275 | 7/1990 | Miki et al. | 296/37.8 |
| 4,993,010 | 2/1991 | Kishimura et al. | 369/36 |
| 5,021,902 | 6/1991 | Ishikawa et al. | 360/92 |
| 5,025,338 | 6/1991 | Sone et al. | 360/99.06 |
| 5,041,929 | 8/1991 | Fryberger et al. | 360/92 |
| 5,050,020 | 9/1991 | Campbell et al. | 360/92 |

FOREIGN PATENT DOCUMENTS 262503  11/1988  Fed. Rep. of Germany ...... 206/444

Primary Examiner—Aristotelis Psitos
Assistant Examiner—Jefferson Evans
Attorney, Agent, or Firm—McAndrews, Held & Malloy, Ltd.

[57] ABSTRACT

An apparatus and method to automate the handling of multiple digital tape cassettes for processing by commercially available cassette tape readers and recorders. A removable magazine rack stores a plurality of tape cassettes, and cooperates with a shuttle device that automatically inserts and removes cassettes from the magazine to the reader and vice-versa. Photocells are used to identify and index to the desired tape cassette. The apparatus allows digital information stored on multiple cassettes to be processed without significant operator intervention.

8 Claims, 16 Drawing Sheets

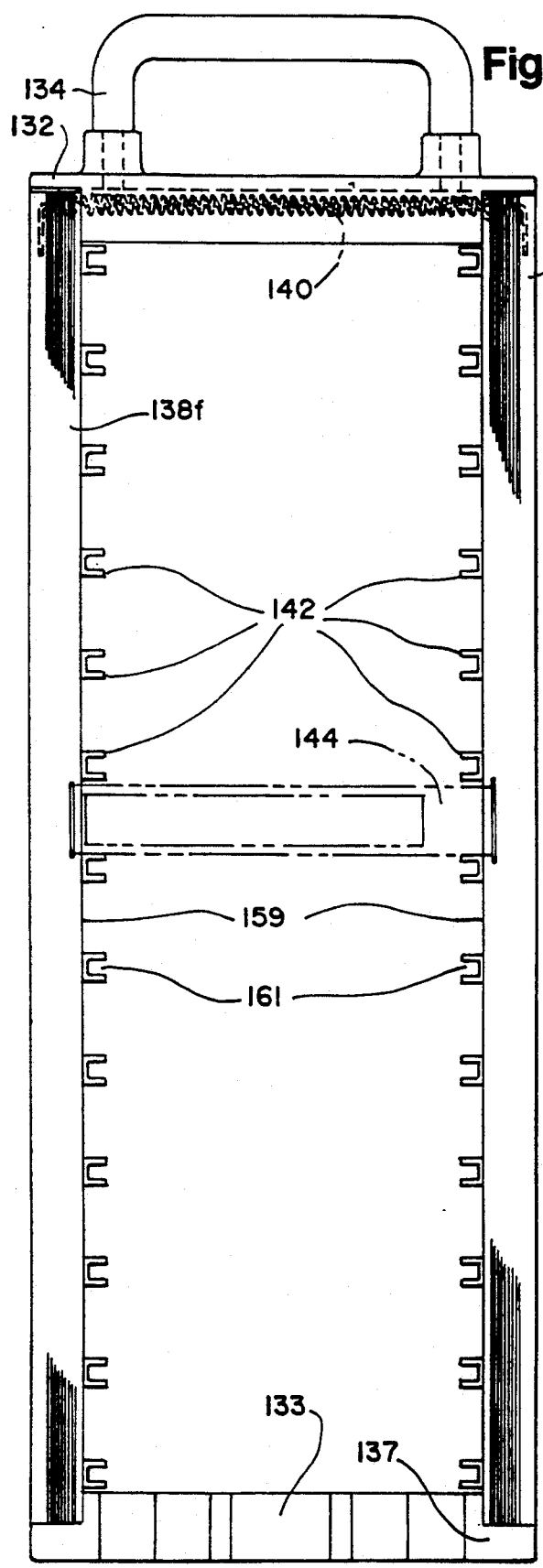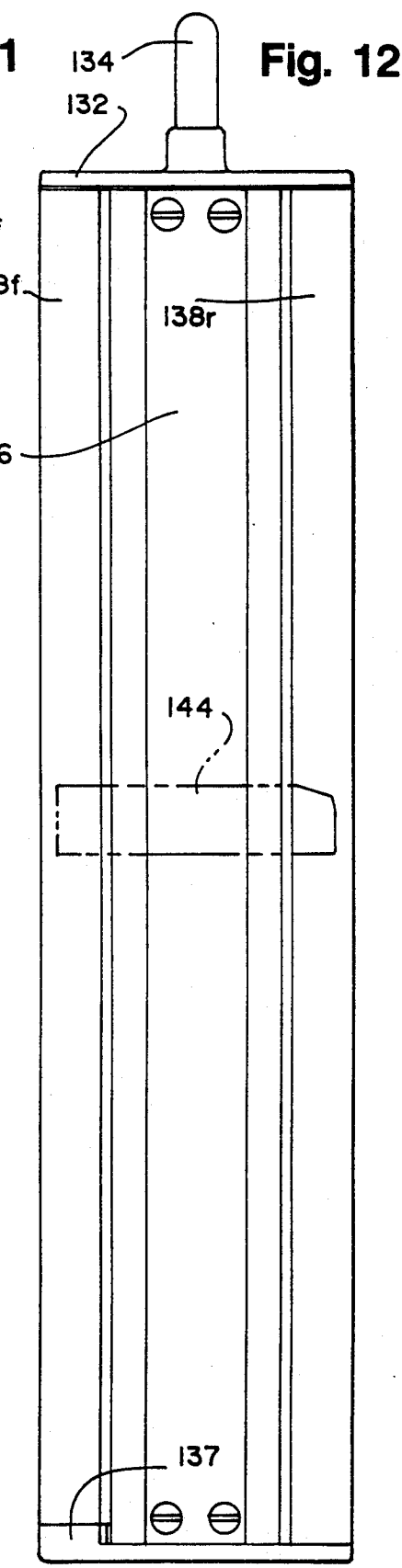

APPARATUS AND METHOD FOR LOADING AND UNLOADING MULTIPLE DIGITAL TAPE CASSETTES UTILIZING A REMOVABLE MAGAZINE

This invention was made with Government support under Contract No. DE-AC-76CH03000, awarded by the U.S. Department of Energy. The Government has certain rights in the invention.

FIELD OF THE INVENTION

The present invention relates to an apparatus and method for handling tape cassettes on which digital information is stored for processing by a digital tape reader or recorder. More particularly, the present invention relates to an apparatus and method for handling the storage and conveyance of digital tape cassettes, as well as the insertion of the cassettes into and subsequent removal from the reader/recorder.

BACKGROUND OF THE INVENTION

Magnetic tape in cassette form, such as that used for video recorders, has extremely high capacity for digital data storage. In the case of eight millimeter (8 mm) tape cassettes, each cassette is capable of storing approximately 2.2 gigabytes of digital data and takes a minimum of about 2.5 hours to process using existing hardware, such as the Exabyte cassette tape reader.

The processing of digital tape cassettes is slower than conventional reel-type digital tapes because existing digital cassette tape readers and recorders can accept only one cassette at a time. Substantial operator time is therefore consumed in locating, inserting and removing the cassettes, one at a time, to be processed with existing commercially available digital cassette tape readers and recorders. To overcome these limitations, it would be advantageous to group together several cassettes for sequential processing, and to provide an automatic method for conveying, inserting and removing multiple cassettes without significant operator intervention.

The present invention is directed to an apparatus and method for automating the handling of multiple digital tape cassettes for processing by commercially available cassette tape reader/recorders. A removable magazine rack stores twelve or more tape cassettes, and mates to and automatically inserts and removes cassettes from the reader in command ordered sequence. Photocells are used to identify and index to the desired tape cassette.

OBJECTS OF THE INVENTION

It is therefore an object of the invention to provide an apparatus capable of handling the storage, conveyance, insertion and removal of digital tape cassettes from a commercially available digital cassette tape reader.

Another object of the invention is to provide a digital tape cassette handling apparatus having a removable magazine for loading and storing multiple cassettes to be processed by the reader.

A further object of the invention is to provide a method of storing, conveying, inserting and removing digital tape cassettes from a commercially available reader in which the cassettes are individually processed.

Other objects, advantages and features of the invention will become apparent upon reading the following detailed description and appended claims, and upon reference to the accompanying drawings.

SUMMARY OF THE INVENTION

The above objects are accomplished by an apparatus for handling a plurality of digital tape cassettes for processing by a cassette tape reader. The apparatus comprises a housing for mounting the reader. The housing has an adapter plate that is movable in a direction transverse to the reader. A magazine for storing the cassettes is mounted on the adapter plate of the housing. The magazine is removable from the adapter plate. The magazine has at least one pivotable retaining means for preventing the cassettes from accidentally exiting the magazine when the magazine is removed from the adapter plate and for permitting withdrawal of the cassettes from the magazine when the magazine is mounted on the adapter plate.

The apparatus also comprises means for driving the adapter plate in a direction transverse to the reader when the magazine is mounted on the adapter plate. In addition, means are provided for detecting when the cassette to be processed by the reader is positioned for insertion into the reader. Means are also provided for generating a first signal when the position for insertion is detected. Insertion means, which respond to the first signal, insert the cassette into the reader for processing of the information stored on the cassette. Means are also provided for generating a second signal when the processing by the reader of the information on the cassette is complete. Finally, removal means, which respond to the second signal, remove the cassette from the reader upon completion of processing of the information stored on the cassette.

In the preferred embodiment, the driving means comprises a ladder gear fixedly mounted on the housing. The ladder gear extends in the transverse direction. The driving means further comprises a motor operatively connected to the adapter plate. The motor has a rotating shaft with a hub mounted on its distal end. The hub has a pair of rollers projecting therefrom; at least one of the rollers is in mesh with the ladder gear. Actuation of the motor rotatably displaces one of the rollers from the ladder gear to sinusoidally urge the adapter plate in the transverse direction.

In other preferred embodiments, the detection means comprises a first photocell detector operatively associated with the adapter plate and first indicia affixed to the housing. The first photocell detector detects the first indicia to identify the position of the adapter plate with respect to the reader. The detection means can further comprise a second photocell detector operatively associated with the adapter plate and second indicia affixed to the hub. The second photocell detector detects the second indicia and generates a signal when the hub achieves the proper rotational orientation for insertion and removal of the cassette from the reader.

The insertion means preferably comprises means for shuttling the cassette from the magazine to the reader when the cassette to be processed by the reader is positioned for insertion into the reader. Similarly, the removal means comprises means for shuttling the cassette from the reader to the magazine upon completion of processing by the reader of the information stored on the cassette.

The shuttle means preferably comprises a shuttle arm pivotally mounted on the housing. The shuttle arm includes a pair of jaw members pivotally mounted on one end thereof. The jaw members are biased normally apart and are urged together to engage the cassette during insertion and removal from the reader.

The preferred magazine further comprises a top panel, a bottom panel, two oppositely facing side panels connecting the top and bottom panels, and a plurality of substantially equally spaced channel elements extending transversely along the oppositely facing surfaces of the side panels. The cassettes are stored in the space formed between two adjacent channel elements. When the shuttle means further comprises guide members cooperating within the interior channels of the channel elements, the channel elements guide the path of the shuttle means during insertion and removal of the cassettes from the reader.

Most preferably, the magazine bottom panel has two upwardly projecting corner ledge portions on one side edge thereof. Each of the pivotable retaining members adjacent the corner ledge portions is movable downwardly along its pivot axis. The corner ledge portions arrest the pivotable retaining members in the open position when the retaining members are moved downwardly among their pivot axes.

The method for handling a plurality of digital tape cassettes for processing by a cassette tape reader comprises:

a. mounting the reader on a housing having an adapter plate which is movable in a direction transverse to the reader;

b. storing the cassettes in a magazine removably mounted on the adapter plate; the magazine has at least one pivotable retaining means for preventing the cassettes from accidentally exiting the magazine when the magazine is removed from the adapter plate and for permitting removal of the cassettes from the magazine when the magazine is mounted on the adapter plate;

c. driving the adapter plate in a direction transverse to the reader when the magazine is mounted on the adapter plate;

d. detecting when the cassette to be processed by the reader is positioned for insertion into the reader;

e. generating a first signal when the position for insertion is detected;

f. inserting the cassette into the reader when the first signal is generated;

g. generating a second signal when the processing by the reader of the information on the cassette is complete; and h. removing the cassette from the reader when the second signal is generated.

BRIEF DESCRIPTION OF THE DRAWINGS

For a more complete understanding of the invention, reference should now be made to the embodiments illustrated in greater detail in the accompanying drawings and described below by way of example only. In the drawings:

FIG. 11 is a front elevation view, partly in section, of the cassette magazine illustrated in FIG. 10;

FIG. 12 is a side elevation view, partly in section, of the cassette, magazine illustrated in FIGS. 10 and 11;

DETAILED DESCRIPTION OF THE DRAWINGS

Figure 1:
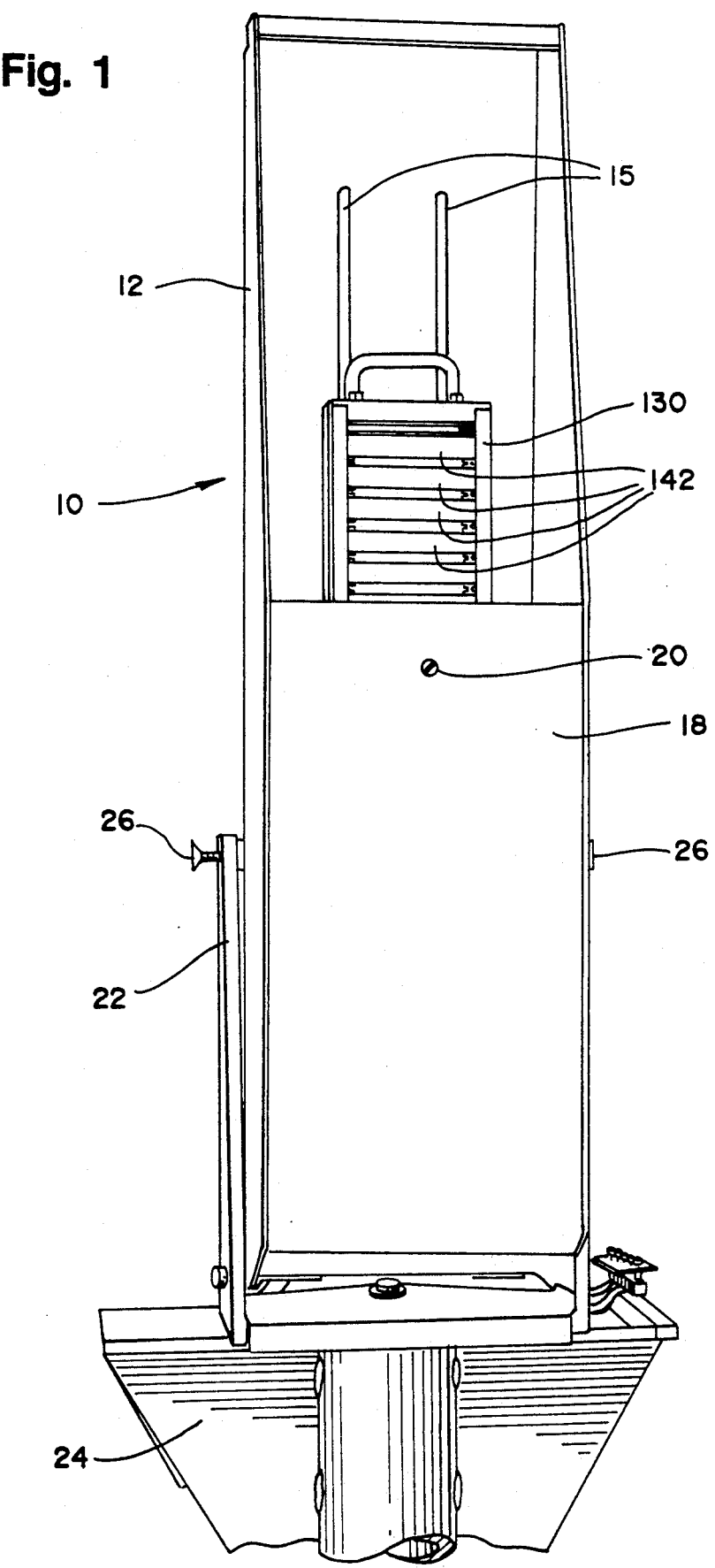
FIG. 1 is a front perspective view of one embodiment the digital tape cassette handling apparatus.

Turning first to FIG. 1 of the drawings, a digital tape cassette handling apparatus 10 is illustrated. Apparatus 10 includes housing 12, which comprises a rear wall and two side walls. Apparatus 10 also includes a magazine 130 for storing a plurality of digital tape cassettes 144. Guide bars 15 are provided to keep the cassettes properly oriented in magazine 130. Guide bars 15 extend downwardly the length of housing 12 except in the area of apparatus 10 in which the shuttle assembly passes through magazine 130 to insert and remove cassettes 144 from the reader.

As further shown in FIG. 1, a removable bottom front cover 18 is secured to housing 12 by fastener 20. Removing cover 18 exposes the magazine drive, shuttle and door closer assembly components, which are described in more detail below. In addition, a movable top front cover, preferably formed of transparent polycarbonate, can be pivotally mounted at the top of housing 12 to prevent exposure of magazine 130 during operation of the apparatus.

Apparatus 10 is supported at the desirable height by support post 24. A U-shaped bracket 22 is attached at its base to support post 24; bracket 22 is in turn connected to housing 12 by means of threaded fasteners 26. Of course, other mounting means, such as a cabinet for example, could be employed.

Figure 2:
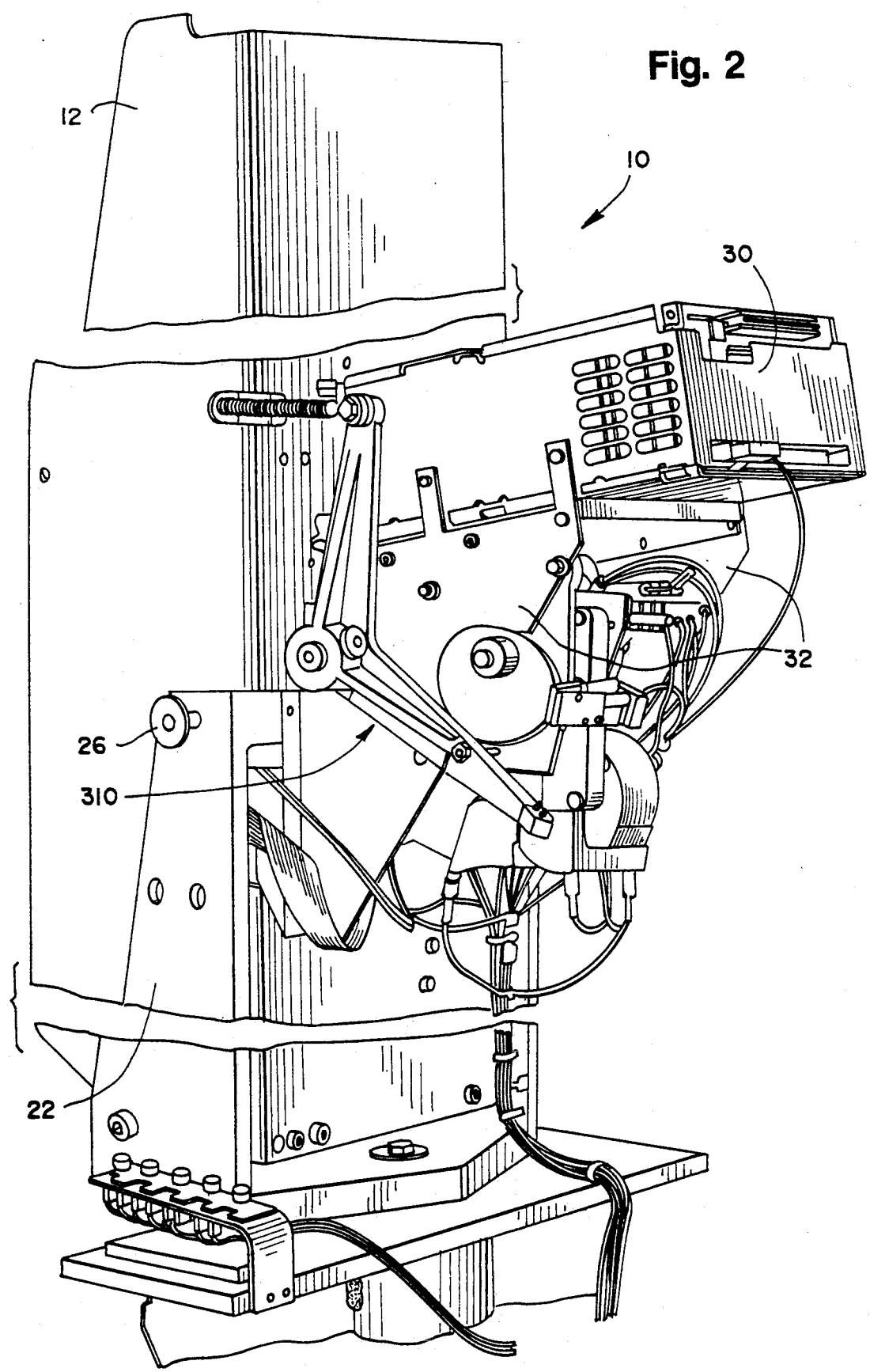
FIG. 2 is a rear perspective view of the digital tape cassette handling apparatus illustrated in FIG. 1.

Turning next to FIG. 2, a rear perspective view of apparatus 10 is shown. Apparatus 10 includes a digital cassette tape reader 30, which is mounted on a pair of brackets 32 extending rearwardly from housing 12. Reader 30 illustrated in FIG. 2 is an Exabyte digital cassette tape reader. However, other suitable digital cassette tape readers and recorders could also be employed. Such suitable readers and recorders are capable of generating a signal upon completion of processing by the reader or recorder of the information stored on a cassette. FIG. 2 also illustrates shuttle assembly 310, which is described in more detail below.

Figure 3:
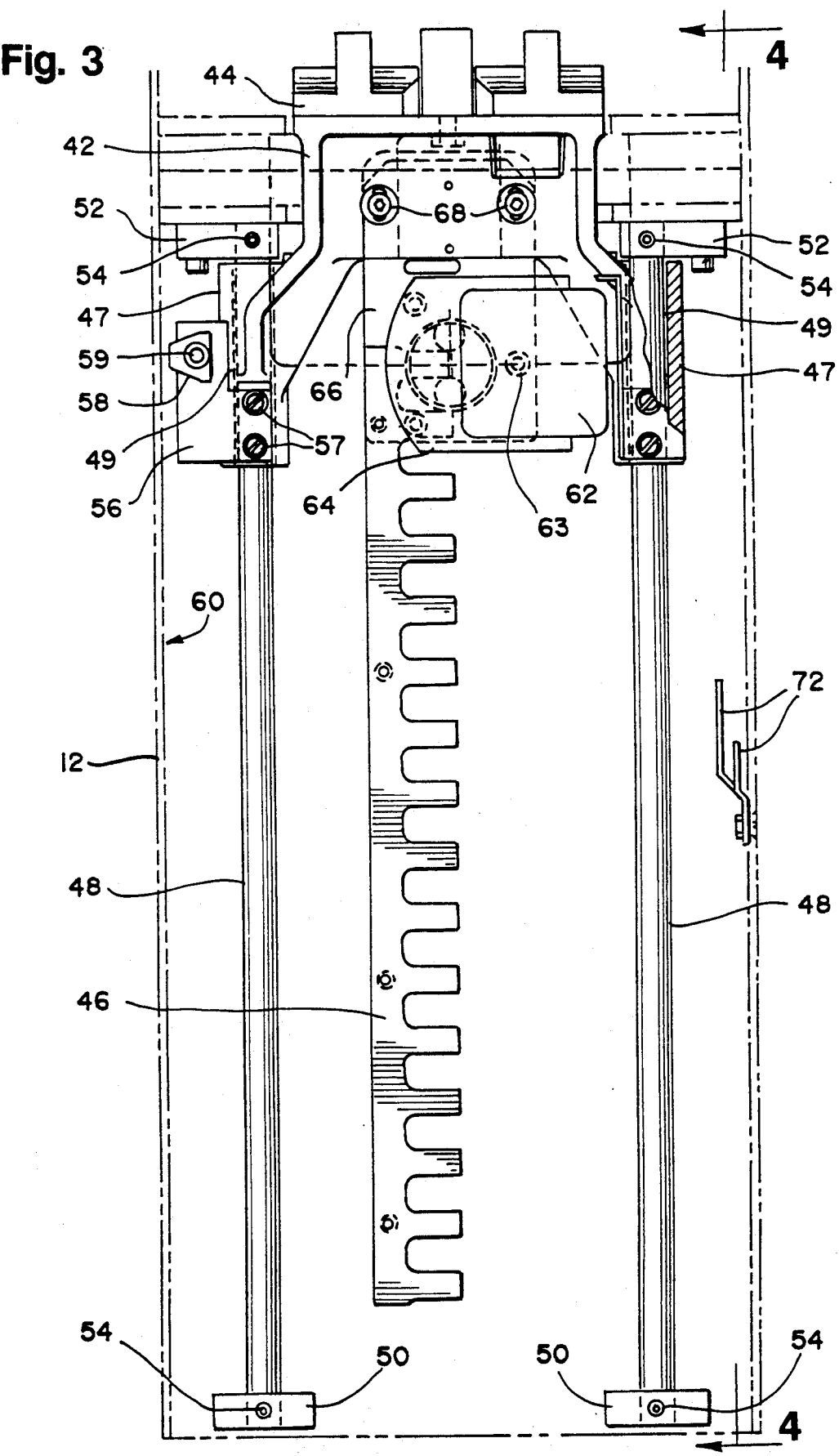
FIG. 3 is a front elevation view, partly in section, of the magazine drive assembly of the digital tape handling apparatus illustrated in FIGS. 1 and 2, showing the relationship of the housing, adapter plate, ladder gear, and motor with hub and rollers.

FIGS. 3-7 illustrate the magazine drive assembly of the digital tape handling apparatus. As shown in FIG. 3, the magazine drive assembly includes adapter plate 44 mounted on carriage 42. Carriage 42 includes bottom portions 47 having cylindrical sleeves 49 formed therein. Carriage 42 is mounted for movement along shafts 48 carried within sleeves 49. Shafts 48 extend in a direction transverse to the reader (i.e., vertically in FIG. 3) and are affixed to housing 12 by lower shaft supports 50 and upper shaft supports 52 using setscrews 54. Carriage 42 and adapter plate 44 are driven along shafts 48, in the transverse direction, by a mechanism which includes ladder gear 46.

As further shown in FIG. 3, photocell bracket 56, attached by screws 57 to carriage 42, has photocells 58 attached by screw 59. Photocells 58 detect the position of adapter plate 44 with respect to the reader (thereby detecting the position of the cassettes) by sensing binary codestrip 60 mounted on and projecting inside one of the side walls of housing 12.

FIG. 3 also illustrates motor 62 having a rotating shaft 63. Gearbox 64 receives motor shaft 63 and drives the hub and roller assembly shown in broken lines in FIG. 3. Motor 62 and gearbox 64 are mounted on motor bracket 66, which is in turn fastened to carriage 42 by mounting screws 68. Brackets 72 support cables extending from inside housing 12.

Figure 4:
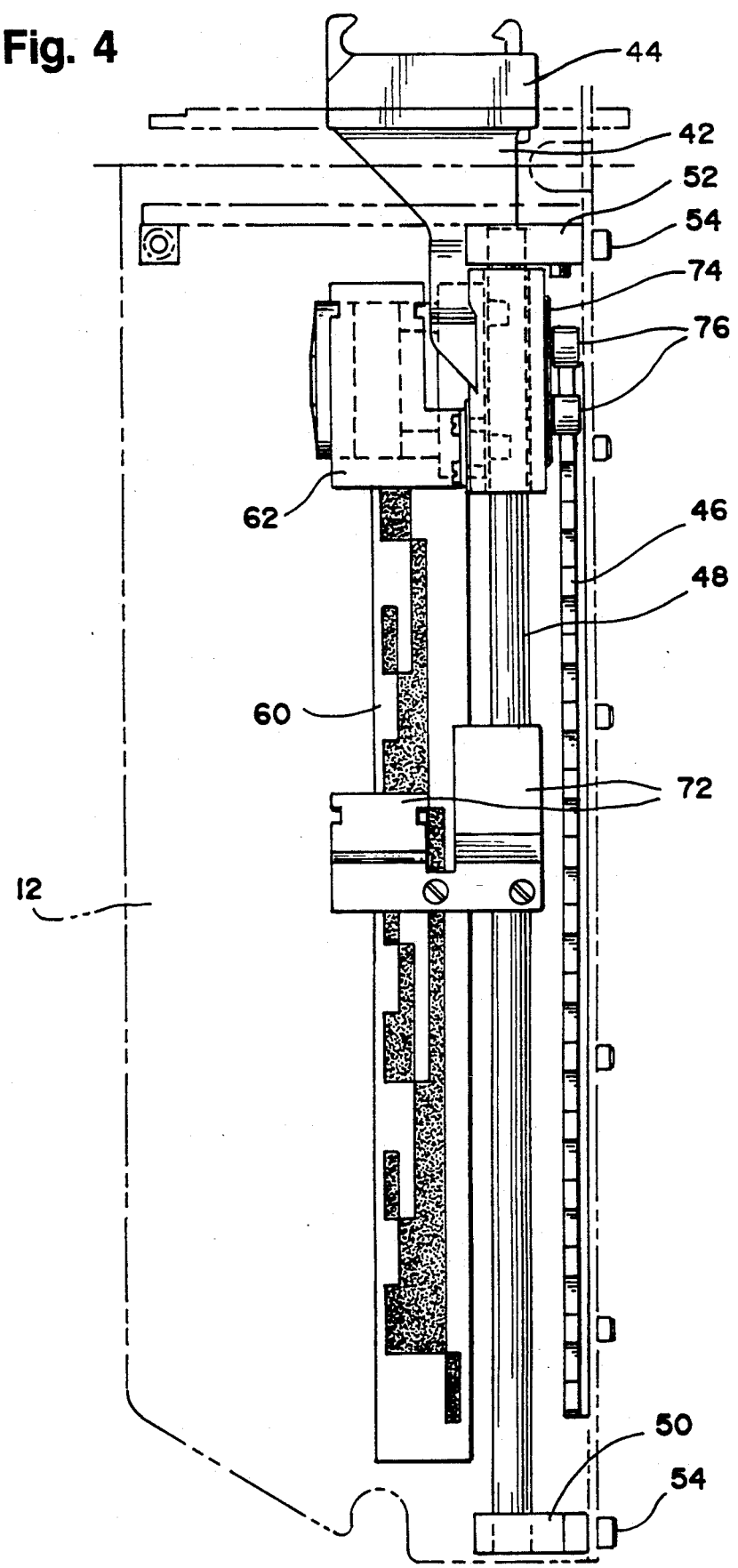
FIG. 4 is a side elevation view, partly in section, of the magazine drive assembly, taken in the direction of arrows 4—4 in FIG. 3, showing the relationship of the adapter plate, photocell bar code reader and binary code strip.

FIG. 4 is a side view taken in the direction of arrows 4—4 in FIG. 3. FIG. 4 more clearly illustrates codestrip 60, which contains the binary codes read by photocells 58 (not shown in FIG. 4) for detecting the position of adapter plate 44 (and the cassette magazine removably mounted thereon). FIG. 4 also illustrates the relationship of housing 12, carriage 42, ladder gear 46, shaft 48, lower shaft support 50, upper shaft support 52, shaft support mounting set screws 54 and location of photocells 58. The relationship of motor 62 and associated gearbox and motor bracket (shown in broken lines) is also shown in FIG. 4. As shown, hub 74 is mounted on the distal end of the rotating shaft extending from the gearbox associated with motor 62. A pair of rollers 76 extend from hub 74, at least one of which is in mesh with ladder gear 46 to drive adapter plate 44 in the transverse direction, as described in more detail below.

Figure 5:
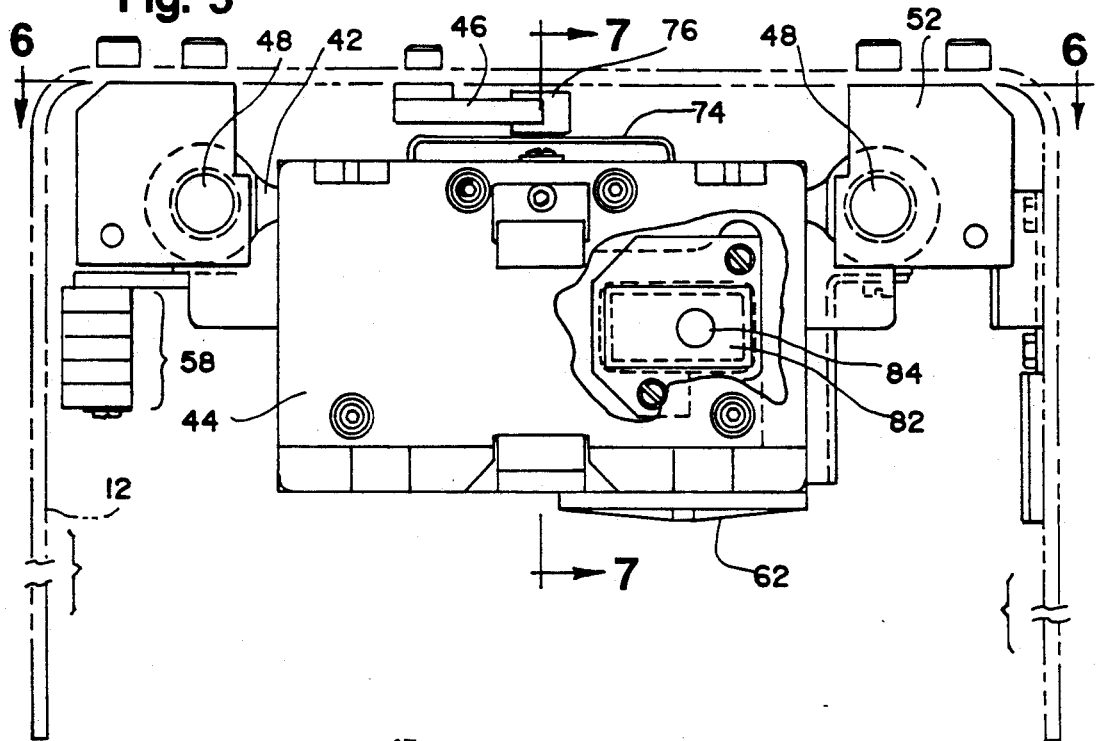
FIG. 5 is a top plan view, partly in section, of the magazine drive assembly of FIGS. 3 and 4, showing the housing and adapter plate for the cassette magazine.

FIG. 5 is a top view of the magazine drive assembly of FIGS. 3 and 4. As shown in FIG. 5, the magazine drive assembly includes carriage 42, adapter plate 44, ladder gear 46, shafts 48, upper shaft supports 52, photocells 58, motor 62, and roller 76 extending from hub 74. In addition, FIG. 5 illustrates interlock switch 82 mounted below adapter plate 44. Interlock switch 82 has an actuating shaft 84 extending upwardly through an opening in adapter plate 44. The mounting of a cassette magazine on adapter plate 44 depresses actuating shaft 84, causing interlock switch 82 to generate a signal indicating that a cassette magazine is in place, and that the cassettes can be driven safely toward the reader for processing.

Figure 6:
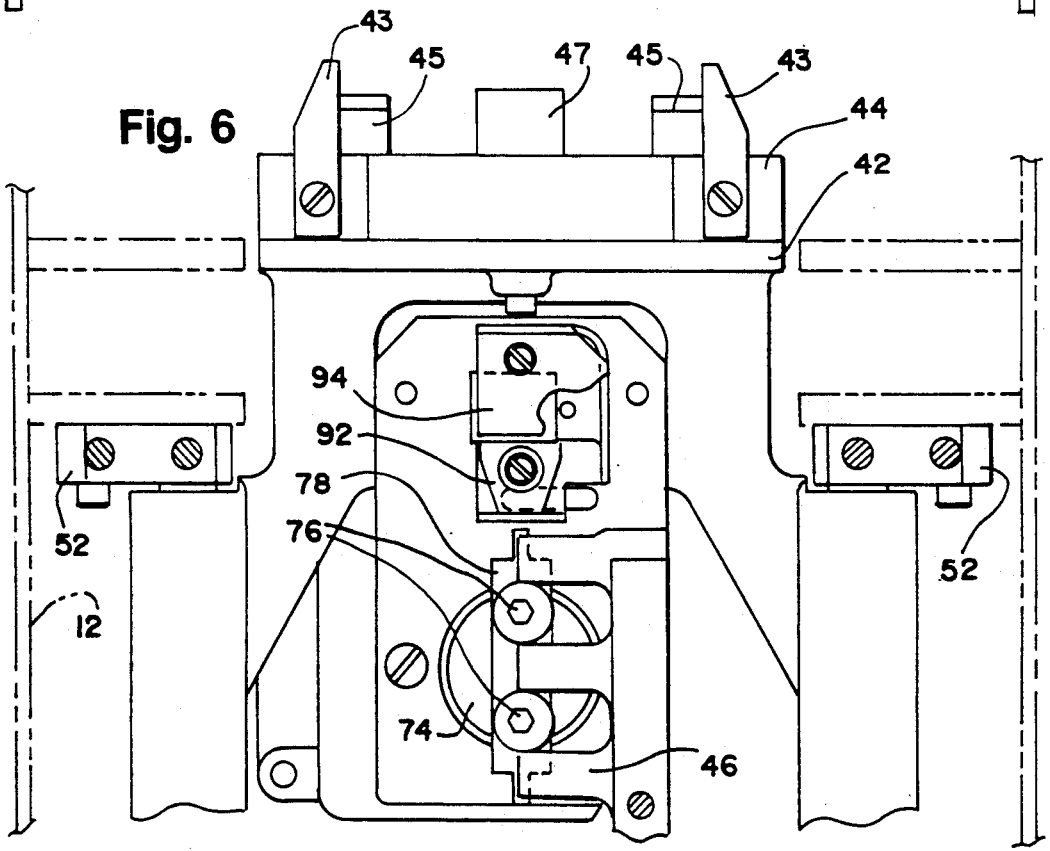
FIG. 6 is a rear elevation view, partly in section, of the magazine drive assembly, taken in the direction of arrows 6—6 in FIG. 5, showing the relationship of the housing, adapter plate, and motor with hub and rollers.

FIG. 6 is a rear view of the magazine drive assembly taken in the direction of arrows 6—6 in FIG. 5. As shown in FIG. 6, the magazine drive assembly includes carriage 42, adapter plate 44, ladder gear 46, motor hub 74 and rollers 76. FIG. 6 also more clearly illustrates fixed retention members 45 and movable retention member 47 for retaining the cassette magazine against adapter plate 44. When the cassette magazine is mounted on adapter plate 44, beveled members 43 urge the rear pivotable retaining members of the cassette magazine into the open position to permit the cassettes to be shuttled from the magazine to the reader and vice versa.

FIG. 6 also shows positioning member 78 affixed to hub 74. Photocell 92 mounted on photocell bracket 94 detects positioning member 78 and generates a signal when hub 74 achieves the proper rotational orientation for insertion and removal of the cassette from the reader (vertically in FIG. 6).

Figure 7:
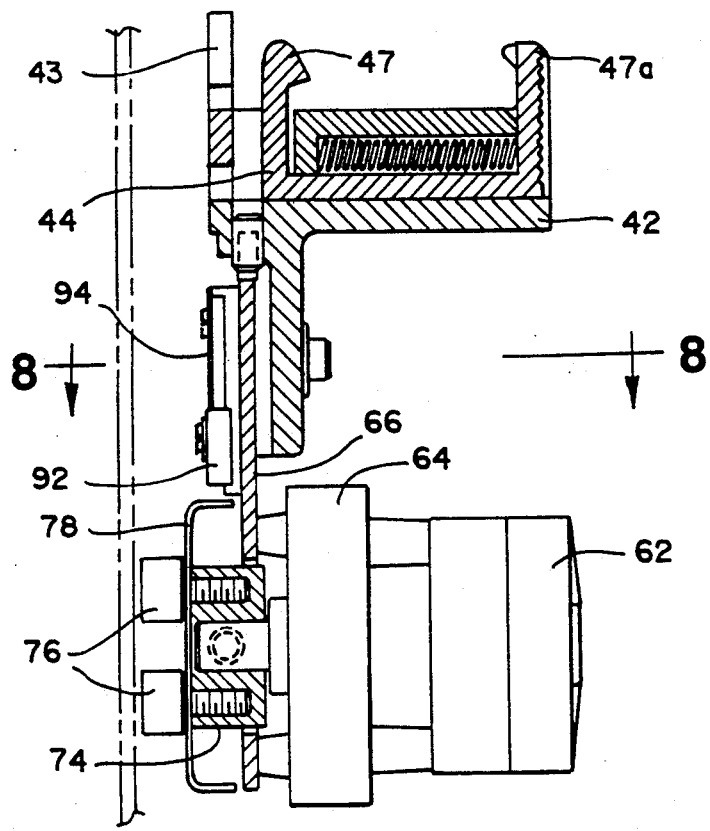
FIG. 7 is a side elevation view, partly in section, of the magazine drive assembly, taken in the direction of arrows 7—7 in FIG. 5, showing the relationship of the housing, adapter plate, and motor with hub and rollers.

FIG. 7 is a side view of the magazine drive assembly, taken in the direction of arrows 7—7 in FIG. 5. As shown in FIG. 7, the magazine drive assembly includes carriage 42, beveled member 43, adapter plate 44, motor 62, gearbox 64, motor bracket 66, hub 74, rollers 76, positioning member 78, photocell 92 and photocell bracket 94. FIG. 7 also shows the structure of movable retention member 47, which is actuated by spring-biased member 47a.

Figure 8:
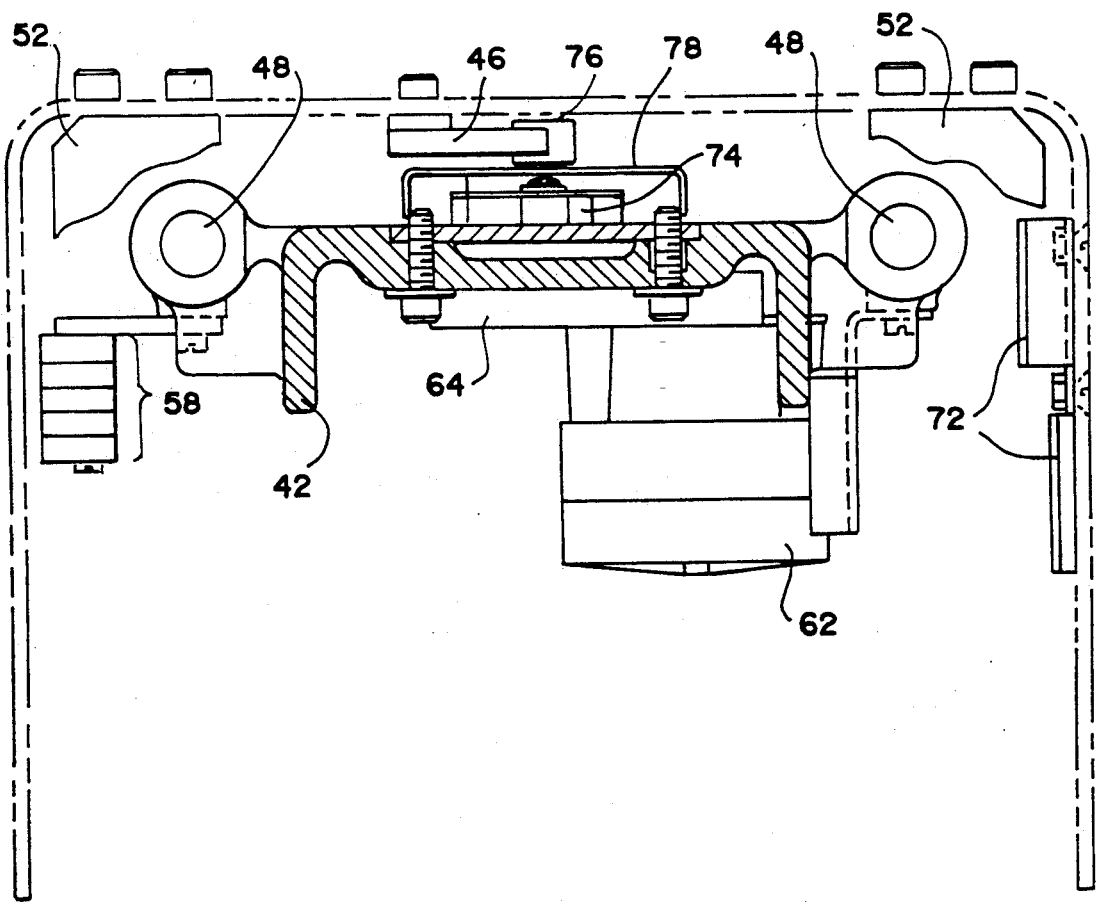
FIG. 8 is a top plan view, partly in section, of the magazine drive assembly, taken in the direction of arrows 8—8 of FIG. 7, showing the relationship of the housing and motor with hub and rollers.

FIG. 8 is a top view of the magazine drive assembly taken in the direction of arrows 8—8 of FIG. 7. As shown in FIG. 8, the magazine drive assembly includes carriage 42, ladder gear 46, shafts 48, upper shaft supports 52, photocells 58, motor 62, gearbox 64, hub 74, roller 76, and positioning member 78.

Figure 9:
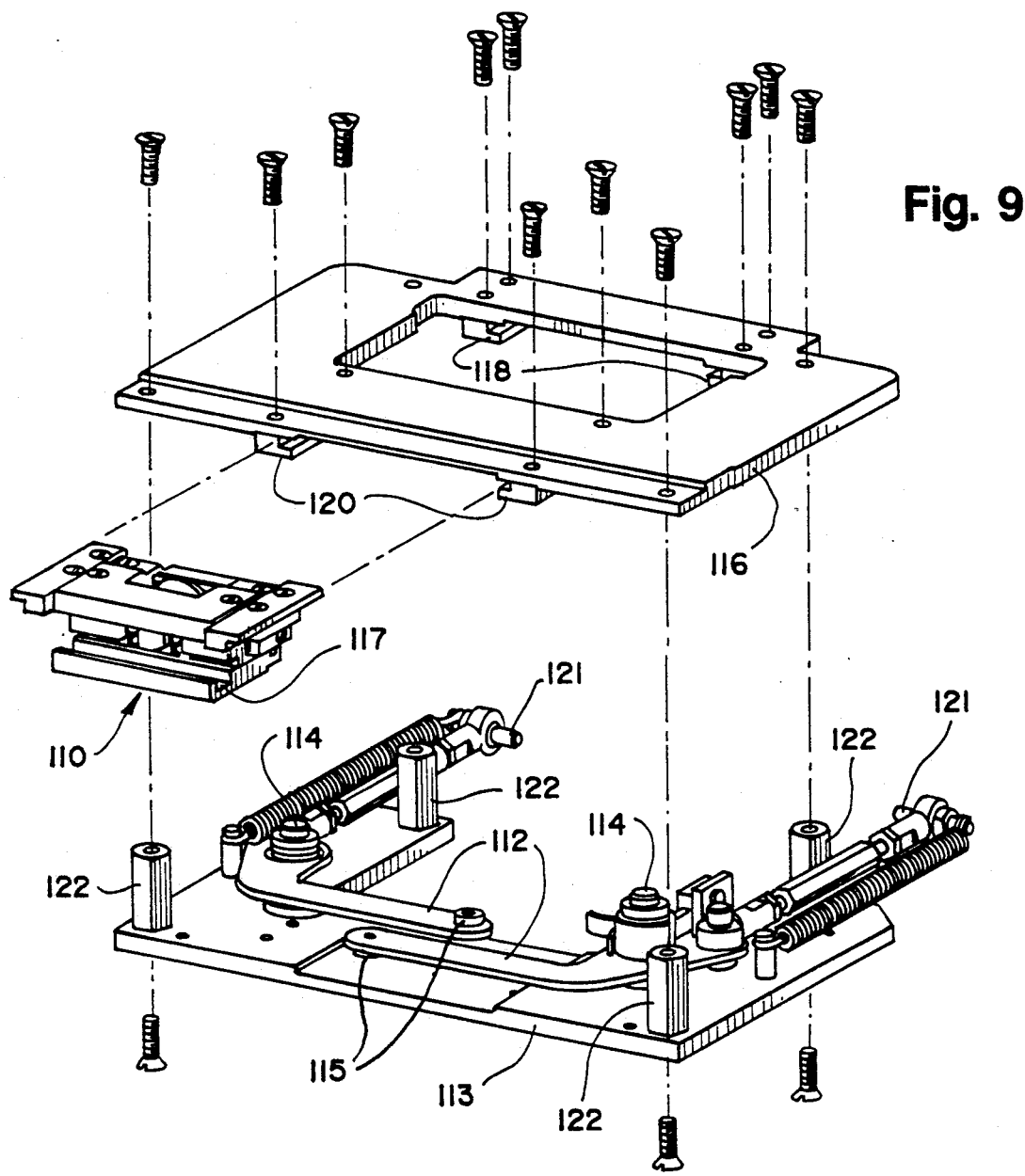
FIG. 9 is an exploded perspective view of the shuttle assembly of the digital tape cassette handling apparatus of FIGS. 1 and 2.

FIG. 9 is an exploded perspective view of the shuttle assembly of the digital tape cassette handling apparatus. FIG. 9 illustrates shuttle body 110 and shuttle arms 112 pivotally mounted at pivot pins 114 to bottom plate 113. Drive wheels 115 are slidably mounted in channels formed in shuttle body 110, one of which is illustrated in FIG. 9 as channel 117. Body 110 is slidably mounted in the channels formed by long guide members 120 and short guide members 118. Guide members 118 and 120 depend from the underside of top plate 116, which is fastened to bottom plate 113 at threaded posts 122, as shown in FIG. 9. Pins 121 are adapted to be received within threaded bores of the shuttle drive assembly, which is described in more detail below.

Figure 10:
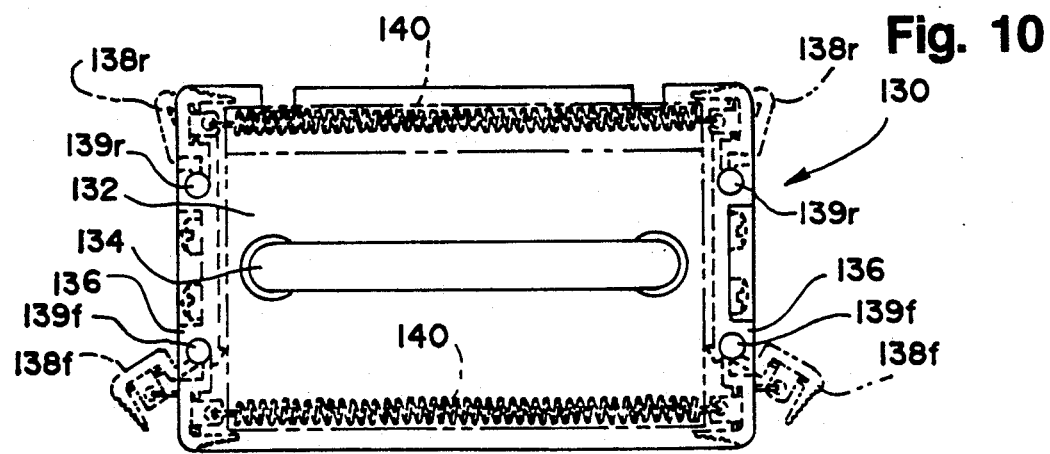
FIG. 10 is a top plan view, partly in section, of the cassette magazine, which is adapted to be removably mounted on the adapter plate illustrated in FIGS. 3-7.

FIGS. 10-12 illustrate the cassette magazine for the digital tape cassette apparatus. FIG. 10 is a top plan view of cassette magazine 130, which is adapted to be removably mounted on adapter plate 44 in FIGS. 3-7. As shown in FIG. 10, cassette magazine 130 includes top portion 132 having handle 134 fastened thereto and side portions 136 extending downwardly from top member 132. Front pivotable retaining members 138f are pivotally mounted at either end of side portions 136 at front pivot axes or pins 139f. Rear pivotable retaining members 138r are pivotally mounted at either end of side portions 136 at rear pivot axes or pins 139r. Springs 140 bias retaining members 138f and 138r in the normally closed position, but permit retaining members 138f and 138r to swing open, as shown by the phantom lines in FIG. 10.

FIGS. 11 and 12 are front and side elevation views, respectively, of cassette magazine 130 illustrated in FIG. 10. As shown in FIGS. 11 and 12, cassette magazine 130 includes top portion 132, bottom portion 133, handle 134, side portion 136, ledge portion 137, front pivotable retaining members 138f, rear pivotable retaining member 138r, and spring 140. Front pivotable retaining members be arrested in the open position by upward projecting corner ledge portion 137.

FIG. 11 also illustrates channel elements 142 mounted along side portions 136. The tape cassettes, one of which is illustrated in phantom lines as cassette 144 in FIGS. 11 and 12, are inserted in the spaces 159 formed between the channel elements 142, as shown in FIG. 11, and stored until processing in the reader. The interior channels 161 formed within channel elements 142 align with the channels formed by guide members 118 and 120 of the shuttle assembly (see FIG. 9) to direct the shuttle assembly through the cassette magazine and toward the reader.

Figure 13:
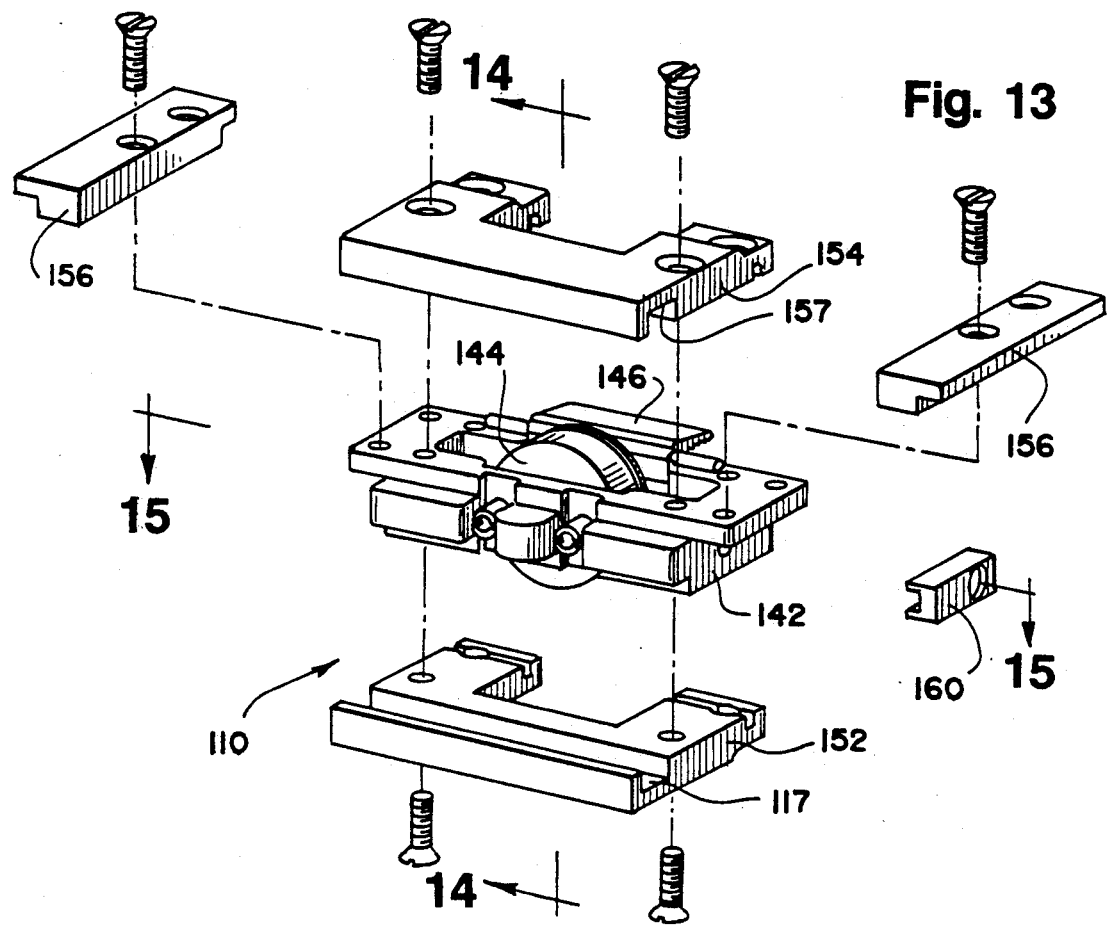
FIG. 13 is an exploded perspective view of the body of the shuttle assembly illustrated in FIG. 9.

FIG. 13 is an exploded perspective view of body 110 of the shuttle assembly illustrated in FIG. 9. As shown in FIG. 13, body 110 includes main portion 142 containing solenoid 144. Top jaw member 146 is pivotally mounted on main portion 142, as shown. Bottom portion 152 and top portion 154 are fastened to main portion 142 with screws, as shown in FIG. 13. Channels 117 and 157 of bottom and top portions 152 and 154, respectively, are adapted to receive drive wheels 115 illustrated in FIG. 9. Wire clamp 160 clamps the wire extending from solenoid 144 outside body 110. Guide members 156 are fastened at the sides of body 110, and serve to guide the shuttle assembly through the channels formed in members 118, 120 (see FIG. 9) and channel elements 142 (see FIG. 11).

Figure 14:
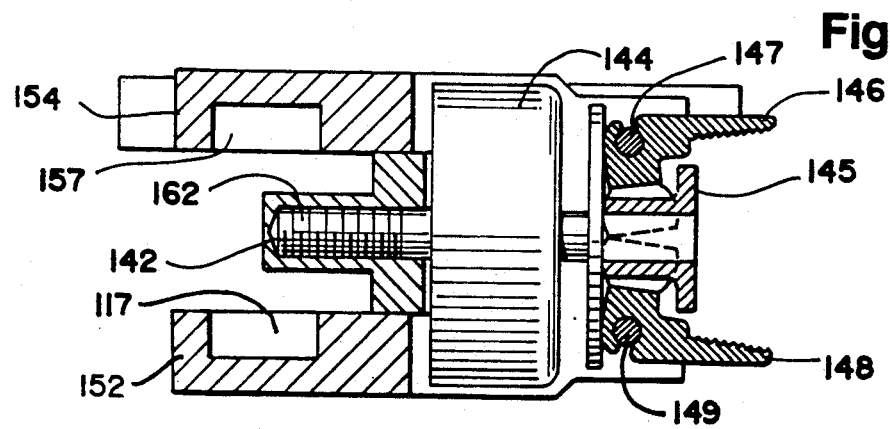
FIG. 14 is a side sectional view of the body of the shuttle assembly,, taken in the direction of arrows 14—14 of FIG. 13.

FIG. 14 is a side sectional view of shuttle body 110 taken in the direction of arrows 14—14 of FIG. 13. As shown in FIG. 14, body 110 includes main portion 142, bottom portion 152 having channel 117 formed therein, top portion 154 having channel 157 formed therein, and solenoid 144 mounted in main portion 142. FIG. 14 also illustrates the manner in which upper jaw member 146 is pivotally mounted on body 110 at pivot pin 147 and bottom jaw member 148 pivotally mounted at pivot pin 149. In addition, FIG. 14 shows solenoid plunger 145, which is driven toward main portion 142 (to the left in FIG. 14) upon actuation of solenoid 144 to urge jaw members 146 and 148 together. Spring 162 urges solenoid plunger 145 away from main portion 142, i.e., to the right in FIG. 14. As shown in broken lines, the base portions of jaw members 146 and 148 are configured so that the jaw members are biased normally apart.

Figure 15:
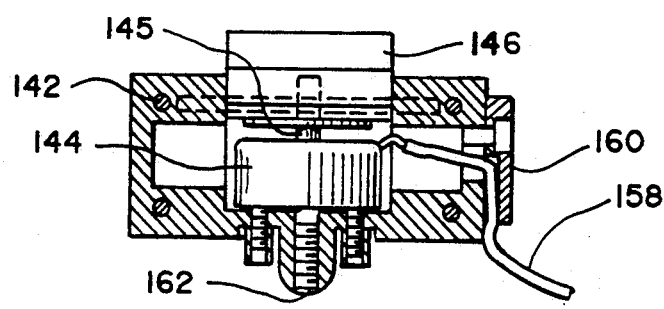
FIG. 15 is a top sectional view of the body of the shuttle assembly, taken in the direction of arrows 15—15 of FIG. 13.

FIG. 15 is a top sectional view of main portion 142 of body 110 taken in the direction of arrows 15—15 of FIG. 13. FIG. 15 illustrates previously described main portion 142, solenoid 144, jaw member 146 and solenoid wire clamp 160. In addition, FIG. 15 shows solenoid wire 158 and spring 162 for urging solenoid plunger 145 away from main portion 142.

Figure 16:
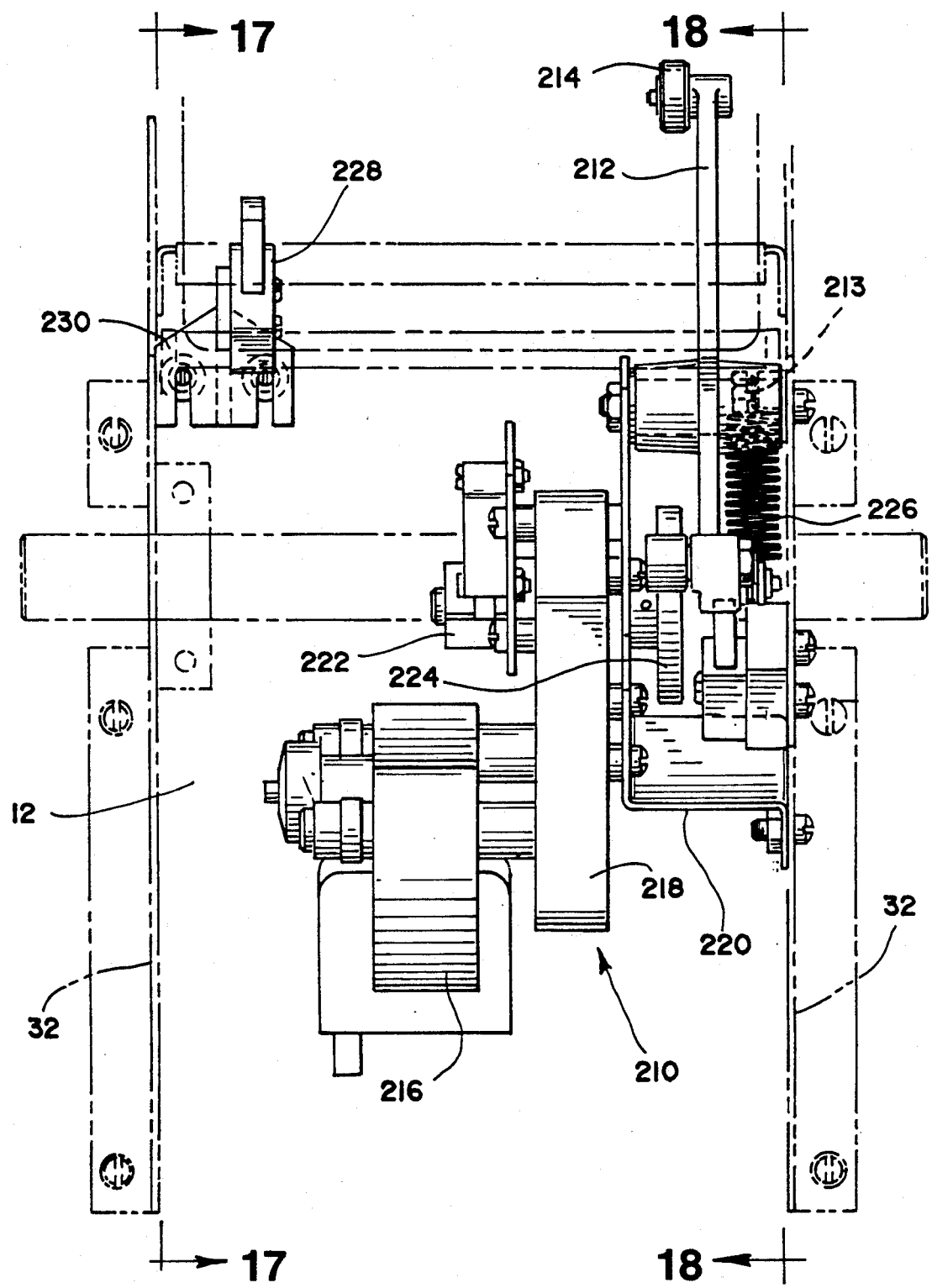
FIG. 16 is a rear elevation view, partly in section, of the door closer assembly of the digital tape cassette handling apparatus illustrated in FIGS. 1 and 2.
Figure 17:
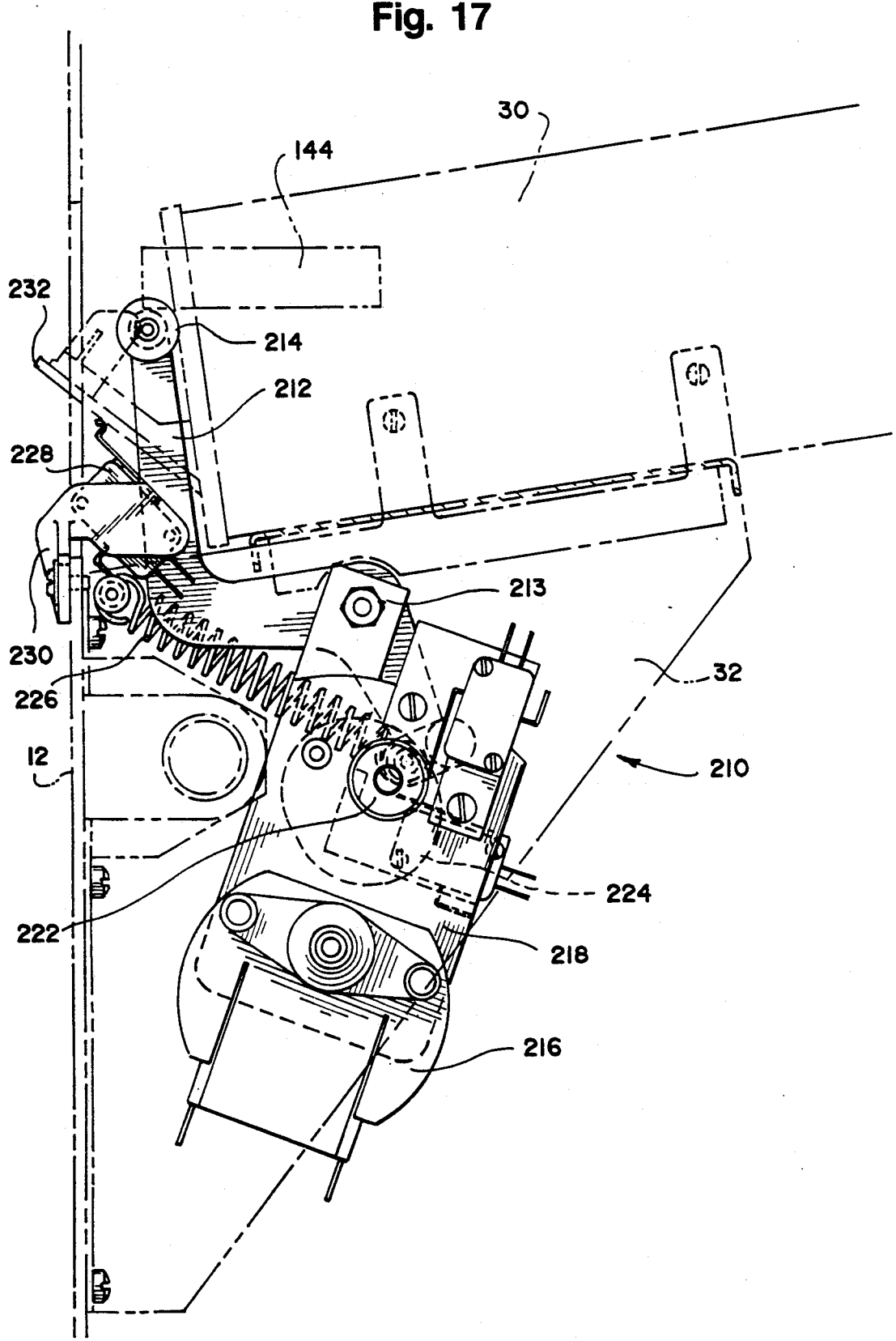
FIG. 17 is a side elevation view, partly in section, of the door closer assembly, taken in the direction of arrows 17—17 in FIG. 16.
Figure 18:
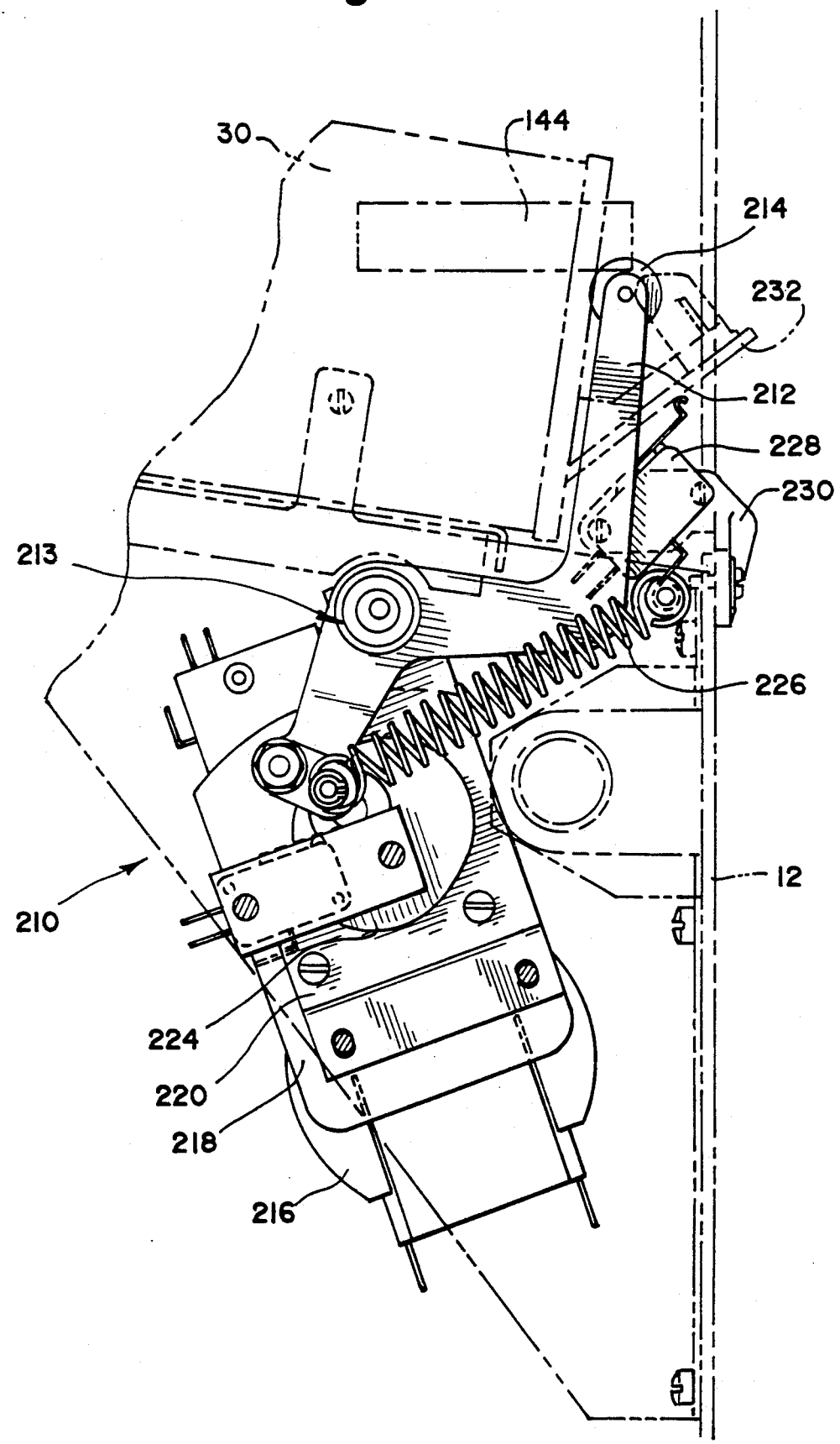
FIG. 18 is a side elevation view, partly in section, of the door closer assembly, taken in the direction of arrows 18—18 in FIG. 16.

FIGS. 16-18 illustrate the door closer assembly of the digital tape cassette handling apparatus. FIG. 16 is a rear elevation view illustrating door closer assembly 210. As shown in FIG. 16, door closer assembly 210 includes door closer arm 212 having roller 214 mounted on the distal end thereof. Door closer arm 212 is pivotally mounted at pivot sleeve 213 on bracket 32, which extends rearwardly from housing 12 to support the reader (not shown in FIG. 16; numeral 30 in FIG. 2). Spring 226 biases door closer arm 212 towards the normally closed-door position. Door closer assembly 210 also includes cam 224 for pivoting door closer arm 212 and urging it into the open-door position. Motor 216 and gearbox 218 for actuating cam 224 are mounted on motor bracket 220 which is in turn fastened to reader bracket 32. Door closer assembly 210 also includes cam switch 222 and door sensing switch 228 mounted on housing 12 by bracket 230.

FIG. 17 is a side elevation view of door closer assembly 210 taken in the direction of arrows 17—17 in FIG. 16. FIG. 18 is a side elevation view of door closer assembly 210 taken in the direction of arrows 18—18 in FIG. 16. FIGS. 17 and 18 illustrate door closer arm 212 pivotally mounted on bracket 32 by pivot sleeve 213, roller 214, motor 216, gearbox 218, motor bracket 220, switch cam 222, cam 224, spring 226, door sensing switch 228 mounted on housing 12 by bracket 230. FIGS. 17 and 18 also illustrate the relative position of door closer assembly 210 with respect to cassette tape reader 30, reader door 232 and tape cassette 144.

Figure 19:
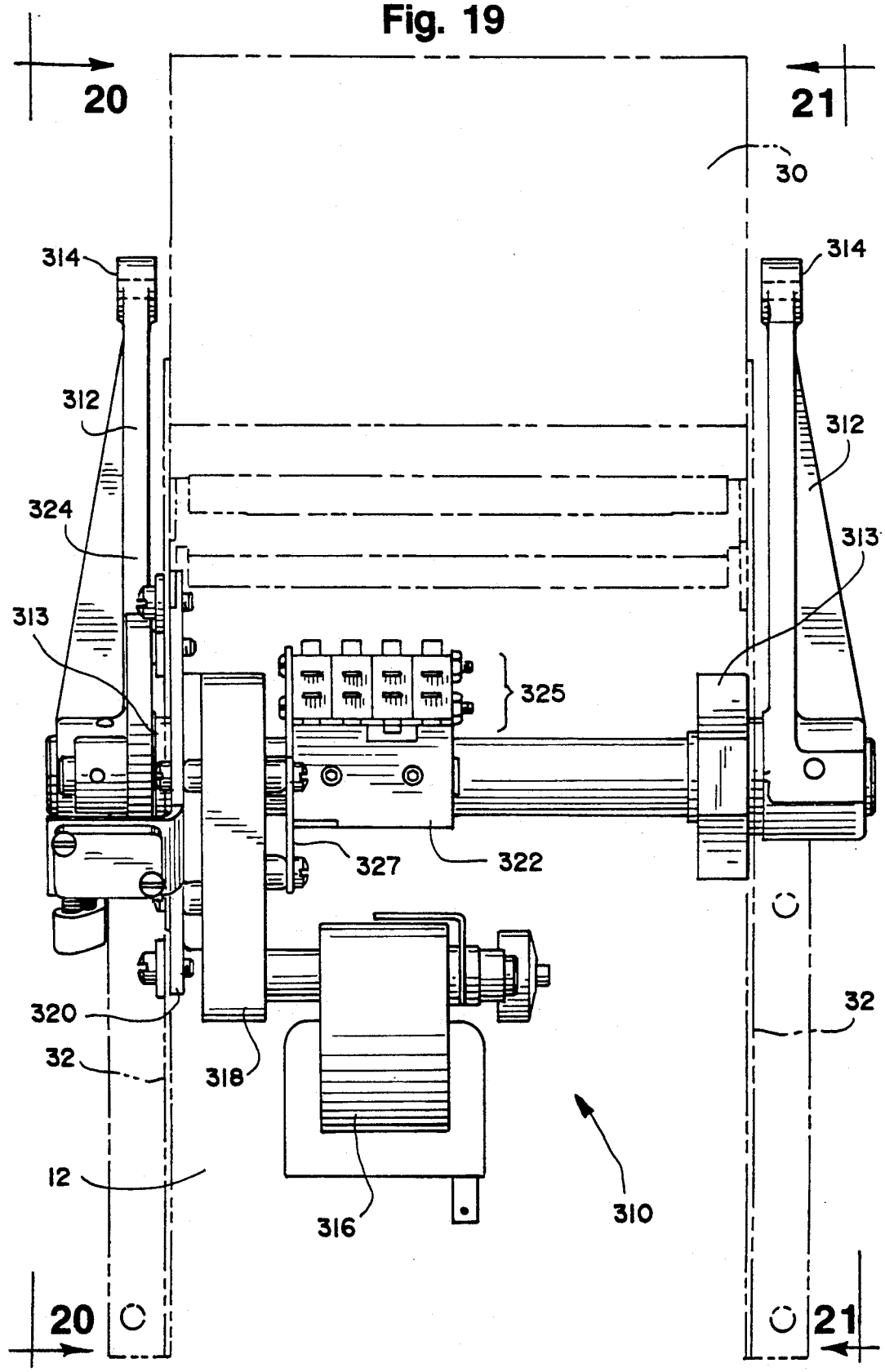
FIG. 19 is a rear elevation view, partly in section, of the shuttle drive assembly of the digital tape cassette handling apparatus illustrated in FIGS. 1 and 2.
Figure 20:
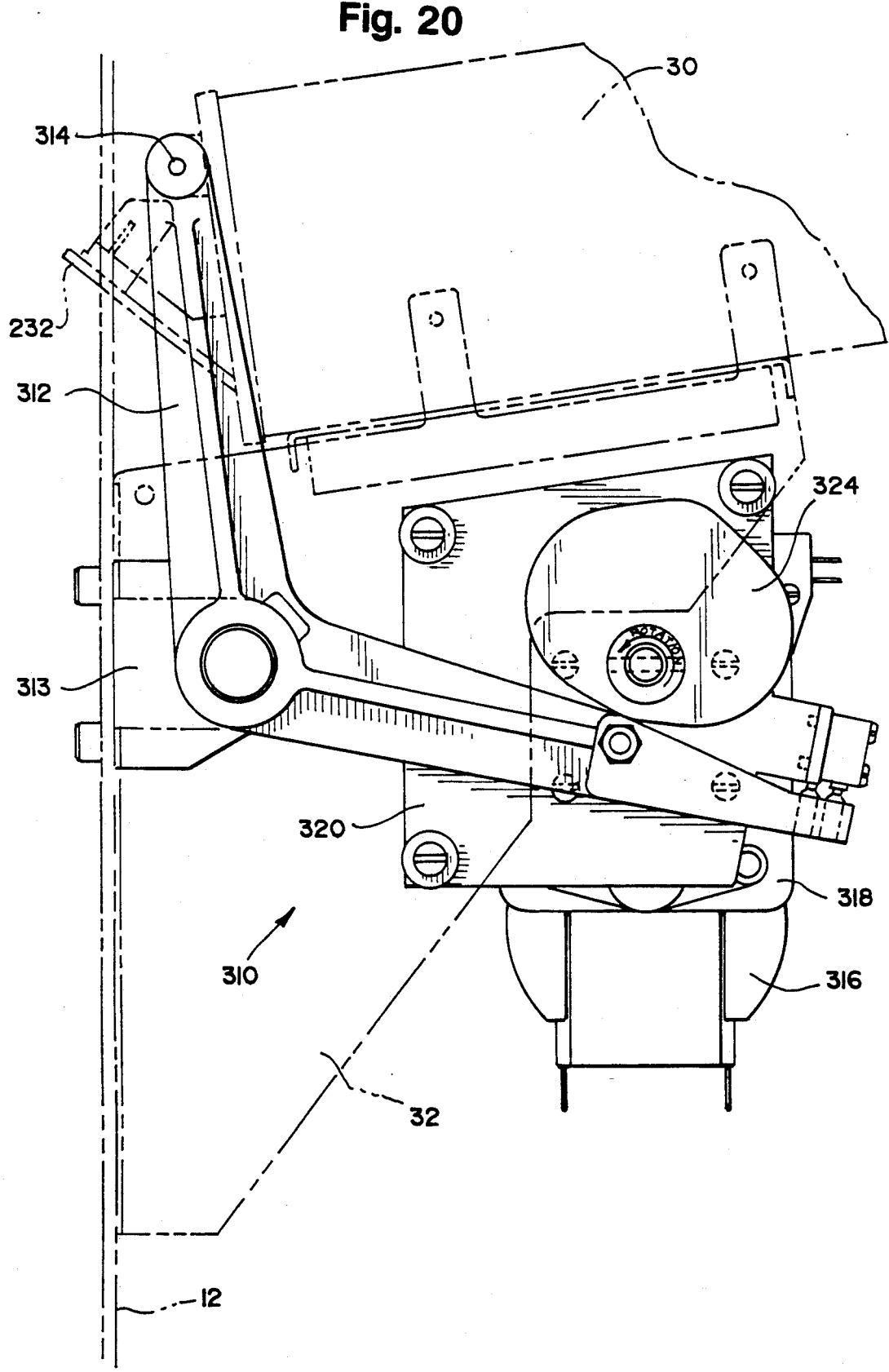
FIG. 20 is a side elevation view, partly in section, of the shuttle drive assembly, taken in the direction of arrows 20—20 in FIG. 19.
Figure 21:
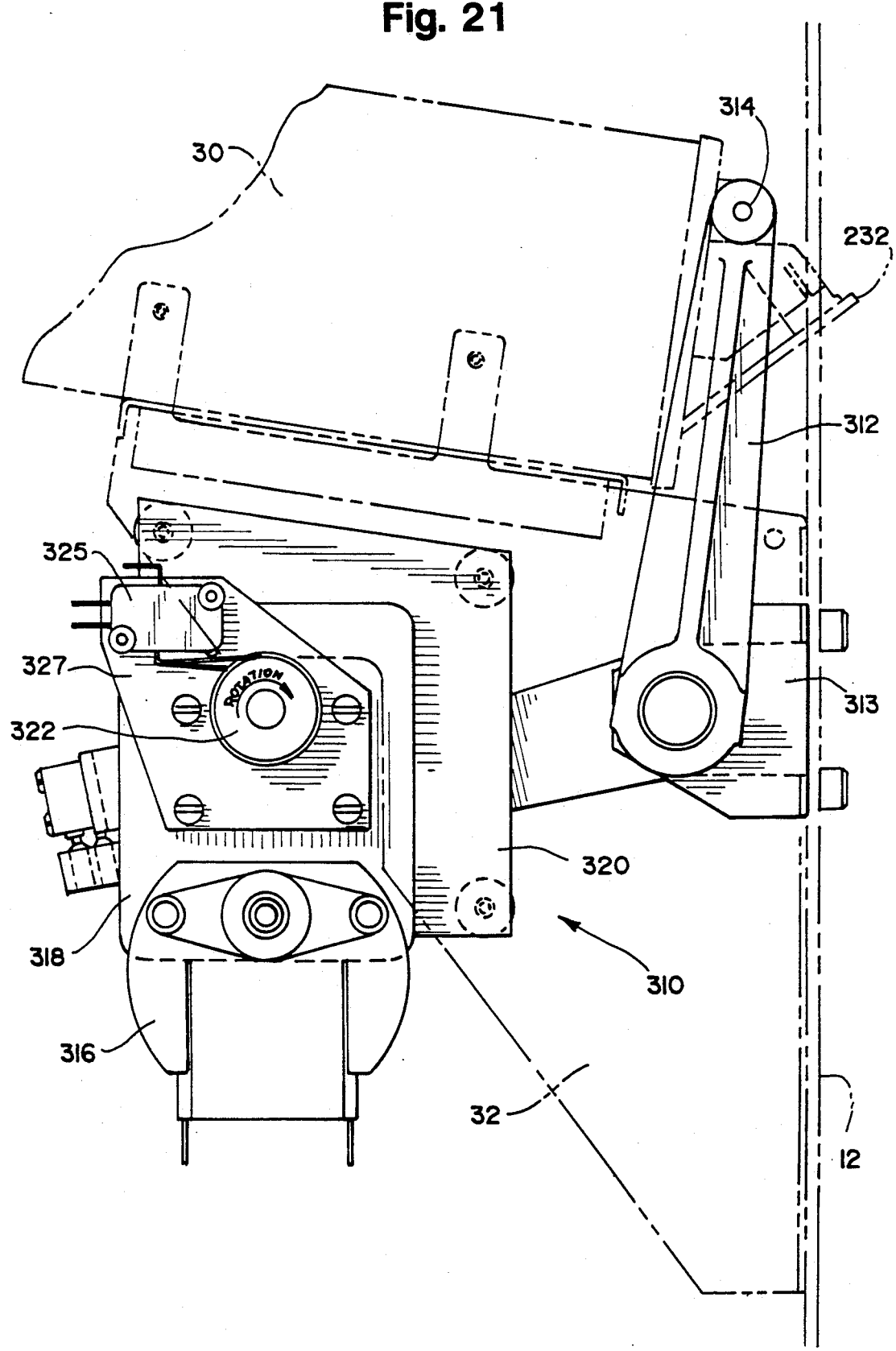
FIG. 21 is a side elevation view, partly in section, of the shuttle drive assembly, taken in the direction of arrows 21—21 in FIG. 19.

FIGS. 19-21 illustrate the shuttle drive assembly of the digital tape cassette handling apparatus. FIG. 19 is a rear elevation view illustrating shuttle drive assembly 310. As shown in FIG. 19, shuttle drive assembly 310 includes shuttle drive arms 312 having threaded bores 314 formed therein at their distal ends for receiving pins 121 of shuttle assembly 110 (see FIG. 9). Shuttle drive arms 312 are pivotally mounted on pillow bearings 313 affixed to housing 12. Shuttle drive assembly 310 also includes cam 324 for pivoting shuttle drive arms 312 and urging the shuttle assembly (not shown in FIG. 19) toward reader 30. Motor 316 and gearbox 318 for actuating cam 324 are mounted on motor bracket 320 which is in turn fastened to reader bracket 32. Shuttle drive assembly 310 also includes cam switch 322. A plurality of microswitches 325 is mounted on bracket 327 fastened to gearbox 318.

FIGS. 20 and 21 are side elevation views of shuttle drive assembly 310 taken in the direction of arrows 20—20 and 21—21, respectively, in FIG. 19. FIGS. 20 and 21 illustrate shuttle drive arms 312 pivotally mounted on housing 12 by pillow bearings 313, motor 316, gearbox 318, motor bracket 320, cam switch 322, cam 324. FIGS. 17 and 18 also illustrate the relative position of shuttle drive assembly 310 with respect to housing 12, cassette tape reader 30, and reader door 232.

Figure 22:
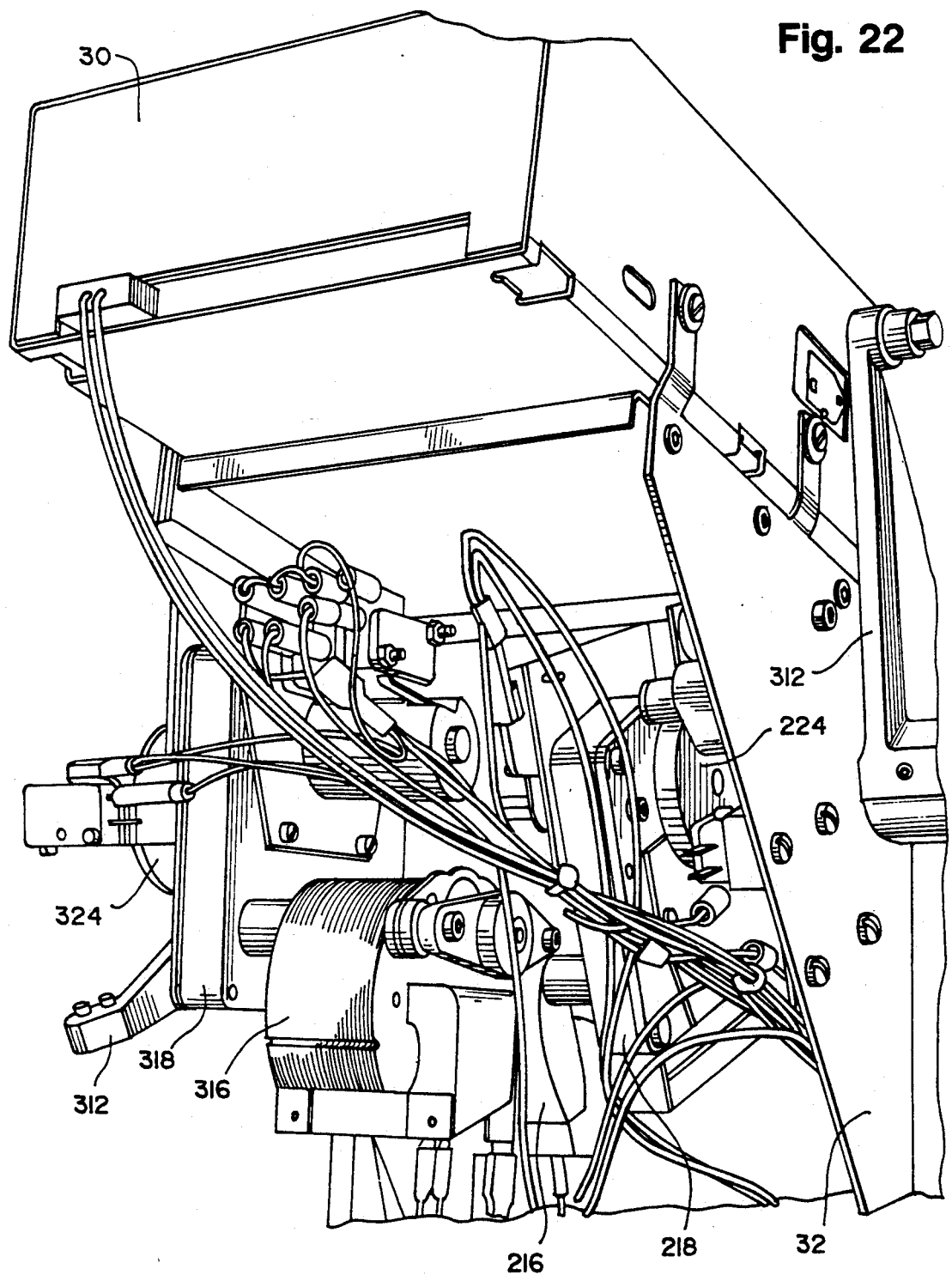
FIG. 22 is a rear perspective view of the digital tape cassette handling apparatus illustrated in FIGS. 1 and 2.

FIG. 22 is a rear perspective view of the digital tape cassette handling apparatus illustrated in FIGS. 1 and 2. FIG. 22 illustrates reader 30 mounted on bracket 32, door closer assembly motor 216 and associated gearbox 218 and cam 224, shuttle drive arms 312, and shuttle drive assembly motor 316 and associated gearbox 318 and cam 324.

In addition to the two photocell detectors described above for identifying the position of the adapter plate and hub, the apparatus can also be provided with a bar code reader for reading bar codes affixed to individual tape cassettes. Such an arrangement would allow for random, command ordered sequencing of tape cassettes for processing by the reader.

In operation, the cassette magazine is driven on the adapter plate by the roller/ladder gear arrangement with an intermittent motion, pausing momentarily at each potential position for insertion of a cassette into the reader. The resultant motion is thus sinusoidal, the pause at each position giving a bar code reader sufficient time to read a bar code on a cassette without needing to build in any deliberate additional pause. Once loaded, the magazine is driven in the transverse direction until the bar code reader detects the next cassette to be processed by the reader. Once that cassette is identified, it can be positioned for insertion into the reader.

Those skilled in the art will recognize that conventional switching techniques can be employed in effecting the sequencing of the magazine drive, shuttle and door closer assemblies described above.

From the foregoing it will be seen that an apparatus and method are provided for automating the handling of multiple digital tape cassettes for processing by commercially available cassette tape reader/recorders. The apparatus has a removable magazine for loading and storing multiple cassettes to be processed by the reader. The apparatus employs an automatic method for conveying, inserting and removing multiple cassettes without significant operator intervention.

While particular embodiments have been set forth herein, alternative embodiments would achieve similar results. Alternative embodiments and various modifications will also be apparent from the above description to those skilled in the art. These and other equivalent alternatives are considered within the spirit and scope of the invention.

What is claimed is:

1. An apparatus for loading and unloading one of a plurality of digital tape cassettes into a cassette tape reader for processing, said apparatus comprising:

a. a housing for mounting said reader, said housing having an adapter plate, said adapter plate movable in a direction transverse to said reader;
  b. a magazine for storing said cassettes, said magazine comprising a top portion, a bottom portion, two oppositely facing side portions connecting said top and said bottom portions, and a plurality of opposed paris of channel elements substantially evenly spaced extending transversely along oppositely facing surfaces of said side portions and defining a space, said cassettes stored in the space formed between two adjacent channel elements, said magazine and said adapter plate constructed for removable mounting of said magazine to said adapter plate and said magazine removably mounted to said adapter plate, said magazine having at least one pivotable retaining means for preventing said cassettes from accidentally exiting said magazine when said magazine is removed from said adapter plate and for permitting withdrawal of said cassettes form said magazine when said magazine is mounted on said adapter plate;
  c. means for driving said adapter plate in a direction transverse to said reader when said magazine is mounted on said adapter plate, said driving means comprising a ladder gear fixedly mounted on said housing and extending in the direction transverse to said reader, and a motor fixedly mounted to said adapter plate, said motor having a distal end and a proximal end and a rotating shaft and a hub mounted on said distal end, said hub having a pair of rollers projecting therefrom at locations to engage the ladder gear at spaced apart locations along the transverse direction when said hub is rotated by said shaft of said motor, thereby translating said adapter plate along said transverse direction;
  d. means for detecting when the cassette to be processed by said reader is positioned for insertion into said reader, said detecting means comprising a first photocell detector operatively associated with said adapter plate and a first indicia affixed to said housing, said first photocell detector detecting said first indicia to identify the position of said adapter plate with respect to the reader, and a second photocell detector operatively associated with said adapter plate and a second indicia affixed to said housing, said second photocell detector detecting said second indicia to identify the position of said adaptor plate with respect to the reader;
  e. means for generating a first signal when said position for insertion is detected;
  f. insertion means responding to said first signal for inserting said cassette into said reader for processing of information stored on said cassette, said insertion means comprising means for shuttling said cassette from said magazine to said reader when said cassette to be processed by said reader is positioned for insertion into said reader, said shuttle means comprising guide members cooperating with the interior channels of said channel elements of said magazine, whereby said channel elements guide the path of said shuttle means during insertion and removal of said cassettes from said reader, said shuttle means further comprising a shuttle arm pivotally mounted an said housing, said shuttle arm comprising a pair of jaw members pivotally mounted on one end thereof, said jaw members biased normally apart and means for urging said jaw members together to engage said cassette during insertion and removal of said cassette from said reader;
  g. means for generating a second signal when the processing by said reader of the information on said cassette is complete;
  h. removal means responding to said second signal for removing said cassette from said reader upon completion of processing of the information stored on said cassette, said removal means comprising said shuttle means.

2. The apparatus of claim 1, said magazine bottom panel having tow upwardly projecting corner ledge portions on one side edge thereof, each of said pivotable retaining members adjacent said corner ledge portions movable downwardly along its pivot axis, whereby said corner ledge portions arrest said pivotable retaining members in the open position when said retaining members are moved downwardly along their pivot axes.

3. In an apparatus for loading and unloading one of a plurality of digital tape cassettes for processing by a cassette tape reader, said apparatus having a housing for mounting said reader, said housing having an adapter plate, said adapter plate movable in a direction transverse to said reader, said apparatus further comprising shuttle means for inserting and removing said cassettes from said reader, the improvement comprising:

a magazine for storing said cassettes, said magazine and said adapter plate constructed for removable mounting of said magazine on said adapter plate, said magazine having a top portion, a bottom portion, two oppositely facing side portions connecting said top and bottom portions, and a plurality of opposed paris of substantially equally spaced channel elements extending transversely along the oppositely facing surfaces of said side portions and defining a space, said cassettes stored in the space formed between two adjacent channel elements, said magazine removably mounted on said adapter plate, said magazine having at least one pivotable retaining means for preventing said cassettes from accidently exiting said magazine when said magazine is removed from said adapter plate and for permitting withdrawal of said cassettes from said magazine when said magazine is mounted on said adapter plate, said shuttle means further comprising guide members cooperating with the interior channels of said channel elements, said guide members translatable along said channel elements, whereby said channel elements guide the path of said shuttle means during insertion and removal of said cassette from the reader.

4. The apparatus f claim 3, said magazine bottom panel having two upwardly projecting corner ledge portions on one side edge thereof, each of said pivotable retaining members adjacent said corner ledge portions movable downwardly along its pivot axis, whereby said corner ledge portions arrest said pivotable retaining members in the open position when said retaining members are moved downwardly among their pivot axes.

5. The method of claim 3, said magazine bottom panel having two upwardly projecting corner ledge portions on one side edge thereof, each of said pivotable retaining members adjacent said corner ledge portions movable downwardly along its pivot axis, whereby said corner ledge portions arrest said pivotable retaining members in the open positions when said retaining members are moved downwardly among their pivot axes.

6. A method for loading and unloading a plurality of digital tape cassettes for processing by a cassette tape reader, said method comprising:

a. mounting said reader on a housing, said housing having an adapter plate, said adapter plate moveable in a direction transverse to said reader, wherein said adapter plate is driven by a ladder gear fixedly mounted n said housing, said ladder gear extending in the transverse direction, and a motor operatively connected to said adaptor plate, said motor having a rotating shaft with a hub mounted on its distal end, said hub having a pair of rollers projecting therefrom, at least one set of rollers in mesh with said ladder gear, whereby actuation of said motor rotatably displaces one of said rollers from said ladder gear to sinusoidally urge said adapter plate in the transverse direction;

b. storing said cassettes in a magazine, said magazine and said adapter plate constructed for removable mounting of said magazine on said adapter plate, and wherein said magazine further comprises a top portion, a bottom portion, two oppositely facing side portions connecting said top and bottom portions, and a plurality of substantially equally spaced channel elements extending transversely along oppositely facing surfaces of said side portions and defining a space, said cassettes stored in the space formed between two adjacent channel elements, said shuttle means further comprising guide members cooperating with the interior channels of said channel elements, whereby said channel elements guide the path of said shuttle means during insertion and removal of said cassettes from the reader, said magazine removable from said adapter plate, said magazine having at least one hinged retaining means for preventing said cassettes from accidentally exiting said magazine when said magazine is removed from said adapter plate and for permitting withdrawal of said cassettes from said magazine when said magazine is mounted on said adapter plate;

c. driving said adapter plate in a direction transverse to said reader when said magazine is mounted on said adapter plate;

d. detecting when the cassette to be processed by said reader is positioned for insertion into said reader, wherein the position for insertion of said cassette into said reader is detected by a first photocell detector operatively associated with said adapter plate and first indicia affixed to said housing, said first photocell detector detecting said first indicia, and wherein the position for insertion of said cassette into said reader is further detected by a second photocell detector operatively associated with said adapter plate and second indicia affixed to said hub, said second photocell detector detecting said second indicia;

e. generating a first signal when said position for insertion is detected by said first and second photocell detectors;

f. inserting said cassette into said reader when said first signal is generated, said cassette inserted into said reader by shuttling said cassette from said magazine to said reader when said cassette to be processed by said reader is positioned for insertion into said reader and where said cassette is removed from said reader by shuttling said cassette from said reader to said magazine upon completion of processing by said reader of the information stored on said cassette and wherein said cassette is shuttled by a shuttle arm pivotally mounted on said housing, said shuttle arm including a pair of jaw members pivotally mounted on one end thereof, said jaw members biased normally apart, and means for urging said jaw members together to engage said cassette during insertion and removal of said cassette from said reader.

7. In a method for loading and unloading a plurality of digital tape cassettes for processing by a cassette tape reader, said method comprising (a) mounting said reader on a housing, said housing having an adapter plate, said adapter plate movable in a direction transverse to said reader, and (b) shuttling said cassettes to insert and remove said cassettes from said reader, the improvement comprising:

storing said cassettes in a magazine, said magazine and said adapter plate constructed for removable mounting of said magazine on said adapter, wherein said magazine further comprises a top portion, a bottom portion, two oppositely facing side portions connecting said top and bottom portions, and a plurality of opposed pairs of substantially equally spaced channel elements extending transversely along the oppositely facing surfaces of said side portions and defining a space, said cassettes store din the space formed between two adjacent channel elements, said magazine having at least one hinged retaining means extending along said magazine and adjacent to all of said cassettes for preventing said cassettes from accidentally exiting said magazine when said magazine is removed from said adapter plate and for permitting withdrawal of said cassettes from said magazine when said magazine is mounted on said adapter plate, and wherein said shuttle means further comprises guide members engaging said interior channels, thereby permitting said shuttle means to translate along said channel elements, whereby said channel elements guide the path of said shuttle means during insertion and removal of said cassettes from the reader.

8. The method of claim 7, said magazine bottom panel having two upwardly projecting corner ledge portions on one side edge thereof, each of said pivotable retaining members adjacent said corner ledge portions movable downwardly along its pivot axis, whereby said corner ledge portions arrest said pivotable retaining members in the open position when said retaining members are moved downwardly among their pivot axes.

* * * * *

UNITED STATES PATENT AND TRADEMARK OFFICE
CERTIFICATE OF CORRECTION

PATENT NO. : 5,182,686

DATED : January 26, 1993

INVENTOR(S) : Carl W. Lindenmeyer

It is certified that error appears in the above-identified patent and that said Letters Patent is hereby corrected as shown below:

Column 7, line 24, after "retaining members", insert --138 f are movable downwardly along their pivot axes, and can--.

Column 9, line 54, cancel "paris" and insert --pairs--.

Column 9, line 67, cancel "form" and insert --from--.

Column 11, line 13, cancel "paris" and insert --pairs--.

Column 11, line 32, after "apparatus", cancel "f" and insert --of--.

Column 11, line 46, cancel "positions" and insert --position--.

Column 11, line 56, after "mounted", cancel "n" and insert --on--.

Column 13, line 8, cancel "store din" and insert --stored in--.

Signed and Sealed this

Seventh Day of December, 1993

Attest:

BRUCE LEHMAN

*Attesting Officer*  *Commissioner of Patents and Trademarks*